Patented May 8, 1934

1,957,572

UNITED STATES PATENT OFFICE 1,957,572

WATER-INSOLUBLE AZO DYESTUFF AND FIBER DYED THEREWITH

Arthur Zitscher, Offenbach-on-the-Main, Germany, assignor to General Aniline Works, Inc., New York, N. Y., a corporation of Delaware No Drawing. Application June 26, 1933, Serial No. 677,766. In Germany June 25, 1932

12 Claims. (Cl. 260—86)

The present invention relates to water-insoluble azo dyestuffs and to fiber dyed therewith; more particularly it relates to compounds of the following general formula:

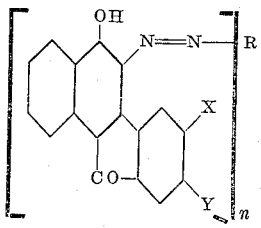

wherein X stands for hydrogen or alkyl, Y for hydrogen or halogen or X and Y jointly stand for the grouping

$n$ means the number 1 or 2 and R represents a radical of the benzene, naphthalene, diphenyl, anthraquinone or carbazole series.

I have found that valuable water-insoluble azo dyestuffs are obtainable by combining diazo compounds with 3-hydroxy-1.2-benzo-fluorenones of the following formula

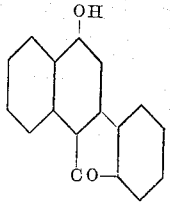

which may also be substituted in the nuclei not containing the hydroxy group, either in substance, on the fiber or on any of the usual substrata adapted for the production of lakes, only such components being used as do not contain any group lending solubility such as the sulfonic acid or carboxylic acid group.

In this manner there are obtained olive to black shades according to the kind of the diazo compounds from mono-amines, amino-azo compounds or polyamines. In comparison with the shades of the azo dyestuffs prepared from naphthols which combine in ortho-position to the hydroxy-group and which yield in general red tints, for instance, when coupled with diazotized monoamines, the shades of the present dyestuffs are considerably displaced.

The new dyestuffs may be used for preparing fast dyeings and printings on the fiber or for preparing pigments.

The following examples serve to illustrate the invention, but they are not intended to limit it thereto, the parts being by weight unless stated otherwise:

(1) 27.7 parts of 1-amino-4-benzoylamino-5-methoxy-2-chlorobenzene are diazotized in the usual manner and the diazo solution is coupled with a solution of 25.9 parts of 3-hydroxy-1.2-benzofluorenone in dilute caustic soda solution to which there have been added the quantity of sodium acetate necessary for binding the excess of mineral acid and 5 parts of Turkey red oil. The precipitated dyestuff which corresponds to the following formula

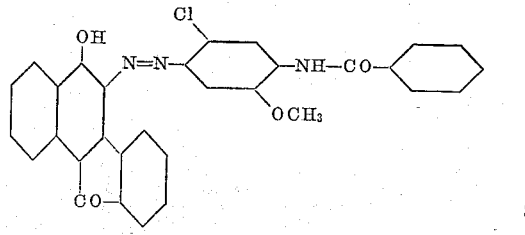

is filtered with suction and washed well. For the preparation of pigments it is advantageously used in the form of a paste and, when mixed with substrata, it yields a dark brown lake.

(2) Cotton piece goods are grounded on a foulard at 70° C. with a solution which contains per liter 20 grams of 3-hydroxy-1.2-benzofluorenone,
20 cc. of caustic soda solution of 34° Bé. and
75 cc. of Turkey red oil and, after intermediate drying, they are developed in a diazo solution feebly acid with acetic acid which contains per liter 1.42 grams of 1-amino-2-methyl-4-chlorobenzene, thereupon, the goods are rinsed and soaped.

A brown-olive dyeing of very good fastness to washing and to ironing as well as of very good capability of being discharged is obtained.

(3) Viscose artificial silk is impregnated in a solution which contains per liter 5 grams of 3-hydroxy-1.2-benzo-fluorenone,
10 cc. of caustic soda solution of 34° Bé.,
10 cc. of Turkey red oil and
20 grams of sodium chloride, well hydroextracted and developed in a tetrazo solution which contains per liter 2.5 grams of 4.4' - diamino - 3.3' - dichlorodiphenyl and which has been neutralized by means of sodium acetate; thereupon the silk is rinsed, first with cold water and then with hot water, soaped for a short time at 60° C. and dried. A dark brown dyeing is obtained.

The dyestuff corresponds to the following formula:

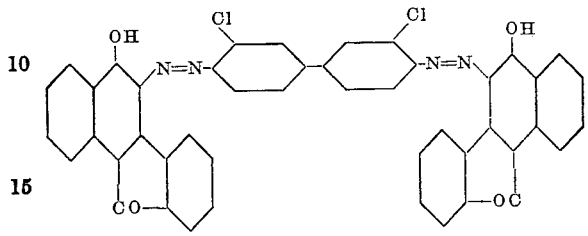

(4) Spun silk is grounded at 20° C. to 25° C. for 15 to 20 minutes in the proportion of the goods to the liquor 1:30 with a solution which contains per liter 5 grams of 3-hydroxy-1.2-benzo-fluorenone,
    10 cc. of caustic soda solution of 34° Bé.,
    10 cc. of Turkey red oil and
    2.5 grams of purified sulfite cellulose waste liquor brought into a powdery form, thereupon, 25 grams of sodium chloride per liter are added and the whole is again handled for 15 to 20 minutes. After squeezing, the dyeing is developed in the course of 30 minutes in a diazo solution which contains per liter 2 grams of 1 - amino - 2 - chloro - 5 - trifluoromethyl-benzene and the excess of mineral acid of which has been neutralized by means of sodium acetate. The dyeing is then rinsed in cold water and acidified with a lukewarm solution containing 30 cc. of concentrated hydrochloric acid per liter, it is then rinsed again, treated with a warm sodium carbonate solution (3 grams of calcined sodium carbonate and 1.5 grams of purified sulfite cellulose waste liquor, brought into a powdery form, per liter), rinsed, soaped twice at 75° C. and dried.

There is obtained a brown-olive dyeing.

When wool is grounded with a solution of 3-hydroxy-1.2-benzo-fluorenone in caustic soda solution and developed in a diazo solution which contains the diazo compound from 1-amino-2-methyl-3-chlorobenzene, there is obtained a black-olive dyeing.

By using other diazo compounds and other 3-hydroxy-1.2-benzofluorenones, the process may be achieved in the same manner.

The following table comprises a number of other combinations obtainable according to the present invention:

| | Diazo compound of— | Combined with— | Shade |
|---|---|---|---|
| 1 | 1-amino-2-methoxy-5-chlorobenzene | 3-hydroxy-1.2-benzofluorenone | Dark brown-olive. |
| 2 | 1-amino-2-phenoxy-5-chlorobenzene | do | Do. |
| 3 | 1-amino-2.5-dichlorobenzene | do | Brownish olive. |
| 4 | 1-amino-2-chloro-4-nitrobenzene | do | Greenish olive. |
| 5 | 1-amino-2-methoxy-4-nitrobenzene | do | Olive-brown. |
| 6 | 1-amino-2-chlorobenzene | do | Brown olive. |
| 7 | 1-amino-2-methyl-5-chlorobenzene | do | Olive-brown. |
| 8 | 1-amino-4-benzoylamino-5-methoxy-2-chlorobenzene | do | Dark brown. |
| 9 | 1-amino-2-methyl-4-nitrobenzene | do | Olive. |
| 10 | 4-amino-3.2'-dimethyl-azobenzene | do | Blackish brown. |
| 11 | 4.4'-diamino-3.3'-dimethoxydiphenyl (after-treated with copper). | do | Black. |
| 12 | 1-amino-3-methyl-2.4-dichlorobenzene | do | Black-olive. |
| 13 | 1-amino-4-benzoylamino-2.5-dichlorobenzene | do | Dark olive-brown. |
| 14 | 1-amino-2-(2'5'-dichlorophenoxy)-5-chlorobenzene | do | Black-olive. |
| 15 | 1-amino-3-benzoyl-benzene | do | Do. |
| 16 | 3-amino-carbazole | do | Dark brown. |
| 17 | 2-amino-1.6-dibromonaphthalene | do | Dark olive-brown. |
| 18 | 1-amino-2-methoxy-5-chlorobenzene | 3-hydroxy-6-methyl-1.2-benzofluorenone | Olive-brown. |
| 19 | 1-amino-2-phenoxy-5-chlorobenzene | do | Dark-brown. |
| 20 | 1-amino-2-(2'-chlorophenoxy)-5-chlorobenzene | do | Brown. |
| 21 | 1-amino-2.5-dichlorobenzene | do | Do. |
| 22 | 1-amino-2-nitrobenzene | do | Gray-brown. |
| 23 | 1-amino-4-methyl-2-nitrobenzene | do | Do. |
| 24 | 1-amino-2-methyl-4-nitrobenzene | do | Olive-brown. |
| 25 | 1-amino-4-methoxy-2-nitrobenzene | do | Gray-brown. |
| 26 | 1-amino-2-methoxy-4-nitrobenzene | do | Olive-brown. |
| 27 | 1-amino-2-diphenylsulfone | do | Middle brown. |
| 28 | 1-aminoanthraquinone | do | Brown. |
| 29 | 1-amino-2-methoxy-5-chlorobenzene | 3-hydroxy-1.2.6.7-dibenzofluorenone | Black-brown. |
| 30 | 1-amino-2-phenoxy-5-chlorobenzene | do | Do. |
| 31 | 1-amino-2-(2'-chlorophenoxy)-5-chlorobenzene | do | Do. |
| 32 | 1-amino-2-methyl-3-chlorobenzene | do | Dark brown. |
| 33 | 1-amino-2-methyl-4-chlorobenzene | do | Do. |
| 34 | 1-amino-2.5-dichlorobenzene | do | Do. |
| 35 | 1-amino-2-nitrobenzene | do | Black-brown. |
| 36 | 1-amino-4-methyl-2-nitrobenzene | do | Do. |
| 37 | 1-amino-2-methyl-4-nitrobenzene | do | Do. |
| 38 | 1-amino-2-methoxy-4-nitrobenzene | do | Do. |
| 39 | 1-aminoanthraquinone | do | Do. |
| 40 | 1-amino-2-diphenylsulfone | do | Reddish dark brown. |
| 41 | 1-amino-2-phenoxy-5-chlorobenzene | 3-hydroxy-7-chloro-1.2-benzofluorenone | Gray-brown. |
| 42 | 1-amino-2.5-dichlorobenzene | do | Middle brown. |
| 43 | 1-amino-4-methyl-2-nitrobenzene | do | Olive-brown. |
| 44 | 1-amino-2-methoxy-4-nitrobenzene | do | Olive-gray. |

Since an object of the present invention is to provide dyestuffs of good fastness properties which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble azo dyestuffs of the following general formula:

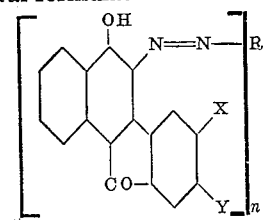

wherein X stands for hydrogen or alkyl, Y for hydrogen or halogen or X and Y jointly stand for the grouping

$n$ means the number 1 or 2 and R represents a radical of the benzene, naphthalene, diphenyl, anthraquinone or carbazole series, yielding, when produced on the fiber, olive to black dyeings of good fastness properties.

2. The water-insoluble azo dyestuffs of the following general formula:

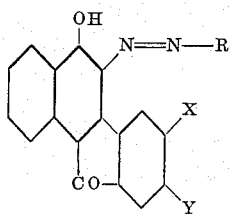

wherein X stands for hydrogen or alkyl, Y for hydrogen or halogen or X and Y jointly stand for the grouping

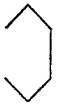

and R represents a radical of the benzene series, yielding, when produced on the fiber, olive to black dyeings of good fastness properties.

3. The water-insoluble azo dyestuffs of the following general formula:

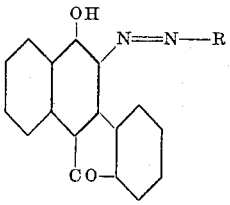

wherein R represents a radical of the benzene series, yielding, when produced on the fiber, olive to black dyeings of good fastness properties.

4. The water-insoluble azo dyestuff of the following formula:

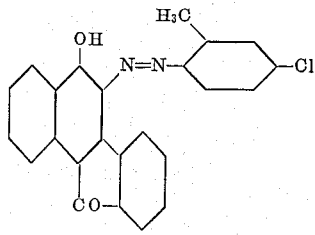

yielding, when produced on the fiber, a brown-olive dyeing of good fastness properties.

5. The water-insoluble azo dyestuff of the following formula:

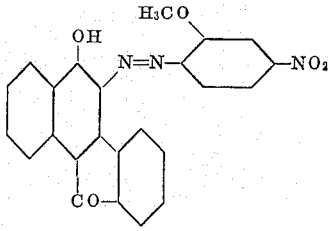

yielding, when produced on the fiber, an olive-brown dyeing of good fastness properties.

6. The water-insoluble azo dyestuff of the following formula:

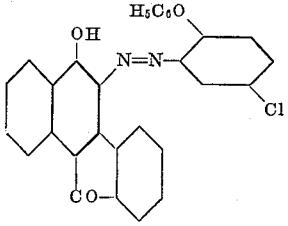

yielding, when produced on the fiber, a dark brown-olive dyeing of good fastness properties.

7. Fiber dyed with the azo dyestuffs as claimed in claim 1.
8. Fiber dyed with the azo dyestuffs as claimed in claim 2.
9. Fiber dyed with the azo dyestuffs as claimed in claim 3.
10. Fiber dyed with the azo dyestuff as claimed in claim 4.
11. Fiber dyed with the azo dyestuff as claimed in claim 5.
12. Fiber dyed with the azo dyestuff as claimed in claim 6.

ARTHUR ZITSCHER.